United States Patent [19]

Hall, III

[11] Patent Number: 5,520,587
[45] Date of Patent: May 28, 1996

[54] POWER TRANSMISSION

[75] Inventor: Arthur Hall, III, Cicero, Ind.

[73] Assignee: General Motors Corporation, Detroit, Mich.

[21] Appl. No.: 434,436

[22] Filed: May 3, 1995

[51] Int. Cl.[6] ........................................ F16H 3/44
[52] U.S. Cl. .............................. 475/218; 475/219
[58] Field of Search .............................. 475/207, 218, 475/219

[56] References Cited

U.S. PATENT DOCUMENTS

| 3,505,905 | 4/1970 | Lepelletier | 475/218 |
| 3,929,037 | 12/1975 | Marsch | 475/218 |
| 4,200,006 | 4/1980 | Ehrlinger et al. | 475/207 |
| 5,013,289 | 5/1991 | Van Maanen | 475/219 |
| 5,039,305 | 8/1991 | Pierce | 475/219 |

FOREIGN PATENT DOCUMENTS

| 4419793 | 12/1994 | Germany | 475/219 |

*Primary Examiner*—Dirk Wright
*Attorney, Agent, or Firm*—Donald F. Scherer

[57] ABSTRACT

A multi-speed power transmission has two simple planetary gear sets interconnected to provide a planetary arrangement. The planetary arrangement has input members selectively connectible by a plurality of friction clutches to a prime mover through two distinct input ratio gear sets. One member of one of the simple planetary gear sets is selectively connectible with both input ratio gear sets via two of the clutches. Two additional clutches and two friction brakes are also included, whereby six forward speed ratios and two reverse speed ratios are attainable by engaging selective combinations of the clutches or clutch and brake.

1 Claim, 1 Drawing Sheet

5,520,587

POWER TRANSMISSION

TECHNICAL FIELD

This invention relates to power transmissions, and more particularly, to multi-speed power planetary transmissions.

BACKGROUND OF THE INVENTION

Multi-speed power transmissions are used in many trucks which operate under various conditions of load, and in passenger vehicles. The trucks may be fully loaded and therefore require many speed steps or ratios in the transmission to make full use of the engine range and acceleration capabilities. The truck may also be lightly loaded or empty. Under these conditions, the operator may desire a transmission with fewer speed steps or gear ratios so that the top running gear can be reached with fewer shifts or ratio interchanges.

The passenger vehicles are generally four speed planetary transmissions, wherein the top gear is an overdrive ratio. In these transmissions, there is generally a relatively large step between the third (direct) to fourth (overdrive) ratios. This is present to take advantage of the overdrive ratio at highway speeds and greatly reduce the fuel consumption of the vehicle. However, the large step between these ratios can result in a shift feel which the driver can perceive under heavy loads. Some drivers may find this undesirable in their vehicle operation. While this occurrence does not affect the overall performance of the vehicle, it would be, from a pleaseability standpoint, better if the large step were not present.

SUMMARY OF THE INVENTION

A multi-speed transmission is provided, wherein a four forward speed and one reverse speed planetary gear arrangement is changed to a six forward speed and two reverse speed gear arrangement through the addition of a ratio input set and a clutch.

It is an object of this invention to provide an improved multi-speed power transmission having six forward speed ratios and two reverse speed ratios.

One aspect of this transmission is found in the use of a four speed planetary gear arrangement accompanied with two ratio input gear sets, one of which drives the standard four speed planetary inputs and the other of which has added input to one of the planetary gear sets.

Another aspect of this transmission is that in providing such ratio gear inputs, two additional gear ratios are provided which establish smaller step ratios between the top three gear ratios, that is, smaller steps in the four to five shift or in the five to six shift.

DESCRIPTION OF THE EXEMPLARY EMBODIMENTS

Figure 1:
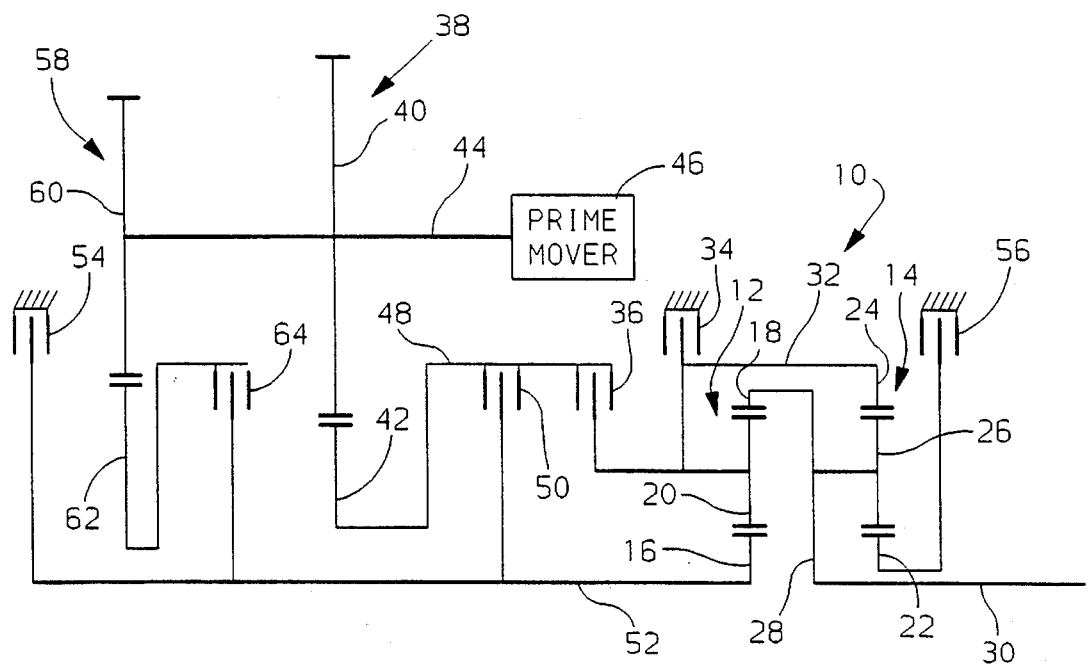
FIG. 1 is a schematic representation of a gear arrangement incorporating the present, invention.

Referring to the drawings, wherein like characters represent the same or corresponding parts throughout the two views, there is seen a planetary transmission gear arrangement, generally designated 10, having two planetary gear sets 12 and 14. The planetary gear set 12 includes a sun gear 16, a ring gear 18 and a planet carrier assembly 20.

The planetary gear set 14 includes a sun gear 22, a ring gear 24 and a planet carrier assembly 26. The planet carrier assembly 26 and ring gear 18 are interconnected by a hub 28 which in turn is drivingly connected with a transmission output shaft 30. The ring gear 24 and carrier assembly 20 are interconnected by a hub structure 32 which is selectively connectible to ground through a brake assembly 34 and is connectible with a clutch assembly 36. The clutch assembly 36 and brake assembly 34 are conventional fluid operated friction torque transmitting devices which are well known in the transmission art.

The clutch 36 is connected via a ratio input gear set 38 comprised of spur gears 40 and 42. The spur gear 40 is connected to a transmission or power input shaft 44 which in turn is driven by a prime mover or internal combustion engine 46. The gear 42 is drivingly connected to a hub 48 which is a component of the clutch 36 and is also a component of a fluid operated clutch 50. The fluid operated clutch 50 is drivingly connected with the sun gear 16 through a shaft 52. The shaft 52 is also selectively connectible to ground through a conventional fluid operated friction brake assembly 54.

One further conventional brake assembly 56 is provided for selectively grounding the sun gear 22. There is also one further input ratio gear set 58 provided. This ratio gear set 58 is comprised of a drive gear 60 and a driven gear 62. The driven gear 62 is selectively connectible through a conventional fluid operated clutch assembly 64 with the sun gear 16.

Figure 2:
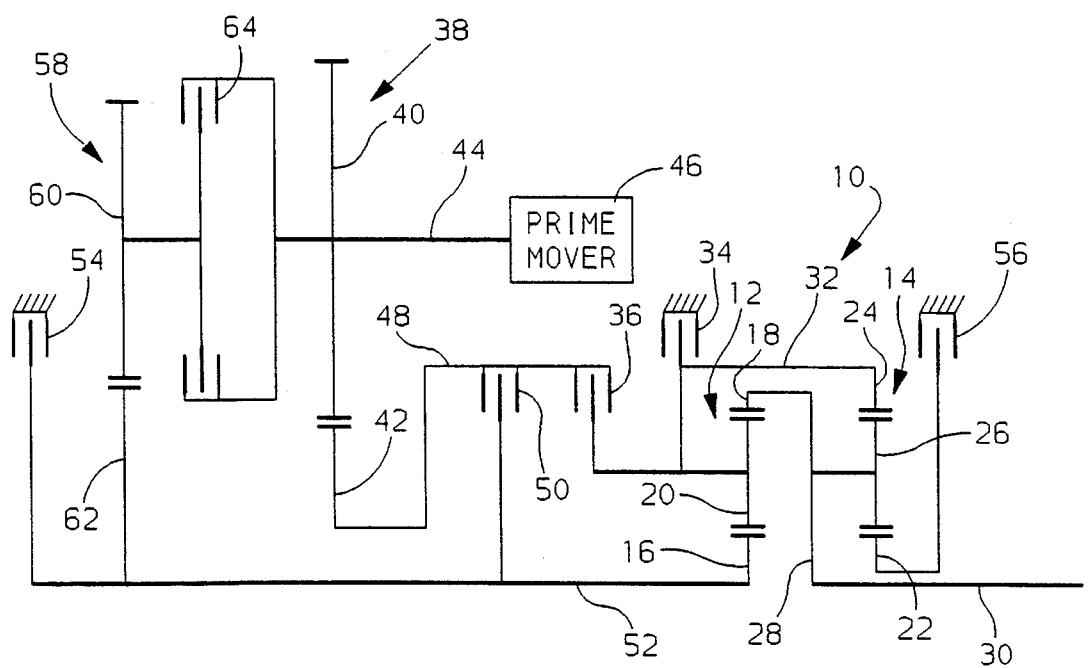
FIG. 2 s a schematic representation of an alternative embodiment of a gear set incorporating the present invention.

A planetary gear arrangement 10 shown in FIG. 2 includes all of the same components described above for FIG. 1, with one minor change. That is, the clutch assembly 64 is disposed between the input shaft 44 and the drive gear 60 of the input gear set 58. Except for this difference, the gear arrangements are identical, such that a description of FIG. 1 will be satisfactory from a performance or operation standpoint as a description for FIG. 2 also.

The planetary gear set 10 with all of the clutches and brakes, with the exception of clutch 64, will provide a four speed power transmission having two underdrives, a direct ratio, an overdrive and one reverse ratio. Transmission gearing arrangements similar to this are utilized in current vehicle transmissions. The addition of clutch 64 adds to the overall performance and operating ability of the transmission 10.

To establish the first and lowest speed, the clutch 64 and brake 56 are engaged. To establish the second forward speed, the clutch 64 is disengaged while the clutch 50 is engaged and the brake 56 remains engaged. To establish the third forward speed, the clutch 36 is engaged while the clutch 50 is disengaged with the brake 56 remaining engaged. To establish the fourth gear ratio, the clutch 50 is engaged while the brake 56 is disengaged. It should be noted that the fourth gear ratio is a direct drive utilizing the input gear set 38 as an input drive mechanism from the prime mover 46.

To establish the fifth forward speed ratio, the clutch 50 is disengaged while the clutch 64 is engaged. This establishes one input speed ratio to the sun gear 16 and a second input speed ratio to the carrier assembly 20. The result of these two input speed ratios is an overdrive condition existing between the input shaft 44 and the output shaft 30. That is, the output shaft 30 will rotate faster than the input shaft 44.

To establish the sixth and highest speed ratio, the clutch 64 is disengaged and the brake 54 is engaged. This establishes an overdrive speed ratio in the planetary gear set 12, such that the output shaft 30 rotates faster than the input shaft 44 at a ratio above that of the fifth forward speed ratio.

To establish the lowest reverse ratio, the clutch 64 and brake 34 are engaged. This establishes a reverse drive in the planetary gear set 12 with the engine input being through the input gear set 58.

To establish the second reverse ratio, the clutch 64 is disengaged while the clutch 50 is engaged, and as can be appreciated from the drawings of FIGS. 1 and 2, the planetary gear set 12 again provides a reverse drive from the input shaft 44 to the output shaft 30. However, the input to the sun gear 16 at this time is determined by the ratio of the input gear set 38.

From the foregoing description, it should be apparent that a single transition ratio interchange can be accomplished between any two forward ratios separated by a single ratio. For example, a first to third interchange, a second to fourth interchange, a third to fifth interchange or a fourth to sixth interchange can be attained.

Any change of ratios between third or sixth is also of the single transition type. Also, a first to reverse interchange requires only a single interchange, such as brake 56 for brake 34. The reverse ratios are also interchanged by swapping a single friction assembly, such as clutch 64 for clutch 50.

Without the addition of the gear set 58 and clutch 64, the first and fifth forward ratios and the low reverse ratio would not be available. That is, the second, third, fourth and sixth ratios and the high reverse would be available to the operator. This is the standard operating condition in passenger vehicle transmissions. The following chart illustrates the various transmission coverage and ratio steps that can be achieved utilizing the present invention and the effect of changing the ratios of the various gear sets.

5 is greatly increased over that of Version 1, the reverse drive ratios are increased also.

It should be noted that while the Version 5 has some increased step ratios, they are not greatly different from those presently available in power transmissions. The main feature to note is that the difference between the direct drive ratio F4 and the overdrive ratio F6 in Version 1, but for the ratio F5, would be a step of 1.58 which is a large step at this end of the speed ratio spectrum. Likewise, in Version 5, the step ratio from the fourth to sixth ratio is 1.42, which is also a large step ratio in the operating range when these ratios are being utilized. While the larger step ratio functions can be accommodated quite easily at the lower ratios, or between the lower ratios, these large steps are not desirable at the higher end of the ratio spectrum.

Accordingly, the use of the present invention introduces a fifth speed ratio which breaks up the large step from four to six into two smaller and much more desirable steps.

The present invention also has the advantage of reducing the lowest speed ratio to a much larger multiplier, such that a smaller ratio torque converter can be utilized, thereby improving the overall efficiency of the vehicle.

It should also be evident in reviewing the version shown in the above chart, that a great amount of versatility is available in the selection of ratio ranges and steps between ratios by incorporating the present invention. This will permit the transmission to be easily associated or connected with various engines. For example, a V-8 engine might be utilized with Version 1 while a four cylinder engine might be utilized with Version 5. Also, Version 5 might be utilized with a larger truck, wherein the payloads are significant in that the high low ration of 5.50 is required in order to help accelerate the vehicle when fully loaded.

The present invention will, therefore, be found quite useful in the automotive vehicle arts, in that the versatility provided is advantageous.

I claim:

|  | Version 1 | | Version 2 | | Version 3 | | Version 4 | | Version 5 | |
|---|---|---|---|---|---|---|---|---|---|---|
| Range | Ratio | Step | Ratio | Step | Ratio | Step | Ratio | Step | Ratio | Step |
| F1 | 3.15 | 1.69 | 4.03 | 1.79 | 4.59 | 1.89 | 4.91 | 1.89 | 5.50 | 2.12 |
| F2 | 1.87 | 1.41 | 2.26 | 1.64 | 2.43 | 1.70 | 2.59 | 1.76 | 2.59 | 1.76 |
| F3 | 1.33 | 1.33 | 1.38 | 1.38 | 1.43 | 1.43 | 1.48 | 1.48 | 1.48 | 1.48 |
| F4 | 1.00 | 1.24 | 1.00 | 1.19 | 1.00 | 1.20 | 1.00 | 1.20 | 1.00 | 1.22 |
| F5 | 0.80 | 1.29 | 0.84 | 1.20 | 0.83 | 1.19 | 0.83 | 1.19 | 0.82 | 1.16 |
| F6 | 0.63 | | 0.70 | | 0.70 | | 0.70 | | 0.70 | |
| R1 | 2.82 | 1.69 | 4.20 | 1.79 | 4.45 | 1.89 | 4.45 | 1.89 | 4.99 | 2.12 |
| R2 | 1.67 | | 2.35 | | 2.35 | | 2.35 | | 2.35 | |
| Coverage | 5.05 | | 5.74 | | 6.54 | | 6.99 | | 7.83 | |
| Input Set | Driver | Driven | Driver | Driven | Driver | Driven | Driver | Driven | Driver | Driven |
| 58 | 29 | 49 | 28 | 50 | 28 | 53 | 28 | 53 | 25 | 53 |
| 38 | 39 | 39 | 39 | 39 | 40 | 40 | 40 | 40 | 39 | 39 |
| Planet Set | Sun | Ring | Sun | Ring | Sun | Ring | Sun | Ring | Sun | Ring |
| 12 | 48 | 80 | 34 | 80 | 34 | 80 | 34 | 80 | 34 | 80 |
| 14 | 26 | 80 | 30 | 80 | 34 | 80 | 38 | 80 | 38 | 80 |

For example, by changing from the gear tooth numbers shown in Version 1 of the above chart to the gear tooth numbers shown for Version 5, which include a change in the input set 58, the planet set 12 and the planet set 14, the overall coverage can be increased from 5.05 to 7.83. With this change, the lowest speed ratio or torque ratio of Version 1. A multi-speed power transmission comprising:

an input shaft;

a driven shaft;

a first pair of input gears having a first gear member connected with the input shaft for continuous rotation therewith and a second gear member rotatably mounted on the driven shaft on an axis parallel with the input shaft;

a second pair of input gears having a third gear member continuously rotatable with one of the shafts and a fourth gear member rotatably mounted on the other of said shafts;

first clutch means for selectively connecting said second gear member with said driven shaft;

second clutch means for selectively connecting said fourth gear with the other of said shafts;

first and second interconnected simple planetary gear sets each having a sun gear, a ring gear and a carrier gear assembly, the sun gear of the first set being continuously rotatably with said driven shaft, the carrier gear assembly of the first set being continuously connected with the ring gear of the second set, the ring gear of the first set being continuously connected with the carrier gear assembly of the second set and with means for delivering power from the transmission, and the sun gear of the second set being selectively held stationary by a selectively first engageable brake;

third clutch means for selectively connecting said second gear member with the carrier gear assembly of the first set;

a second selectively engageable brake means connected with the carrier gear assembly of the first set and ring gear of the second set; and third selectively engageable brake means connected with the driven shaft, said clutches and brake means being engaged in selective combinations including at least one clutch to provide six forward speed ratios and two reverse speed ratios between the input shaft and the output means.

* * * * *